United States Patent [19]

Howard

[11] Patent Number: 4,712,753
[45] Date of Patent: Dec. 15, 1987

[54] SATELLITE RETRIEVAL APPARATUS

[76] Inventor: Thomas R. Howard, PSC #2, Box 15195, APO San Francisco, Calif. 96367

[21] Appl. No.: 13,820
[22] Filed: Feb. 11, 1987
[51] Int. Cl.$^4$ ............................................. B64G 1/64
[52] U.S. Cl. ..................................... 244/161; 244/116
[58] Field of Search ........... 244/115, 116, 161, 158 R; 102/504; 89/36.16, 14.05, 1.11, 1.1; 124/5, 1, 83, 52

[56] References Cited

U.S. PATENT DOCUMENTS

| 1,067,080 | 7/1913 | Tarday | 102/504 |
|---|---|---|---|
| 1,488,182 | 3/1924 | Whelton | 102/504 |
| 2,251,918 | 8/1941 | Dawson | 102/504 |
| 3,095,867 | 7/1963 | Kiyuna | 124/5 |
| 3,268,091 | 8/1966 | Melton | 244/161 |
| 3,478,986 | 11/1969 | Fogarty | 244/161 |
| 4,105,241 | 8/1978 | Mee | 294/86 R |
| 4,173,324 | 11/1979 | Rudmann | 244/161 |
| 4,177,964 | 12/1979 | Hujsak et al. | 244/161 |
| 4,260,187 | 4/1981 | Bejczy | 294/86 R |
| 4,395,006 | 7/1983 | Taylor | 244/161 |
| 4,559,737 | 12/1985 | Washington | 102/504 |

OTHER PUBLICATIONS

"Space Bola, A Satellite Retrieval System", A. E. Wudell et al, 4th Space Congress, Cocoa Beach, Fla., Apr. 3–6, 1967, Session 23, pp. 23-33–23-47.

Primary Examiner—Galen Barefoot
Attorney, Agent, or Firm—Richard J. Donahue; Donald J. Singer

[57] ABSTRACT

Apparatus for capturing and retrieving objects from space. A tethered grappling unit having deployable arms with catching ropes and Velcro hook strips at the ends thereof is spun and propelled towards the target. On impact, the catching ropes envelope the target and each other. The grappling unit is then reeled in and engages a catching collar containing braking plates to despin the target.

6 Claims, 3 Drawing Figures

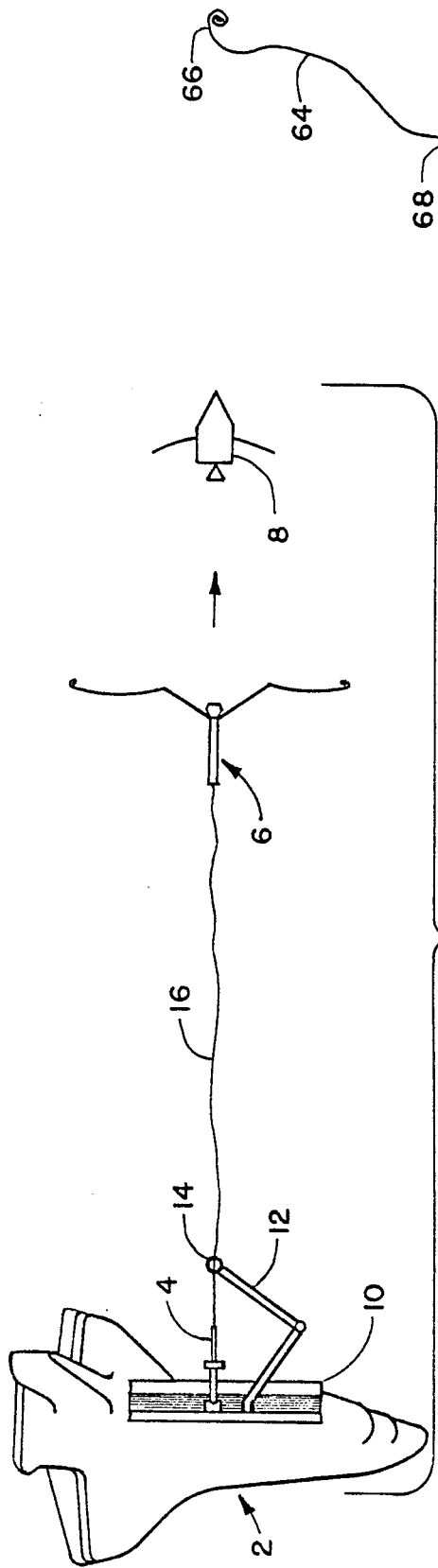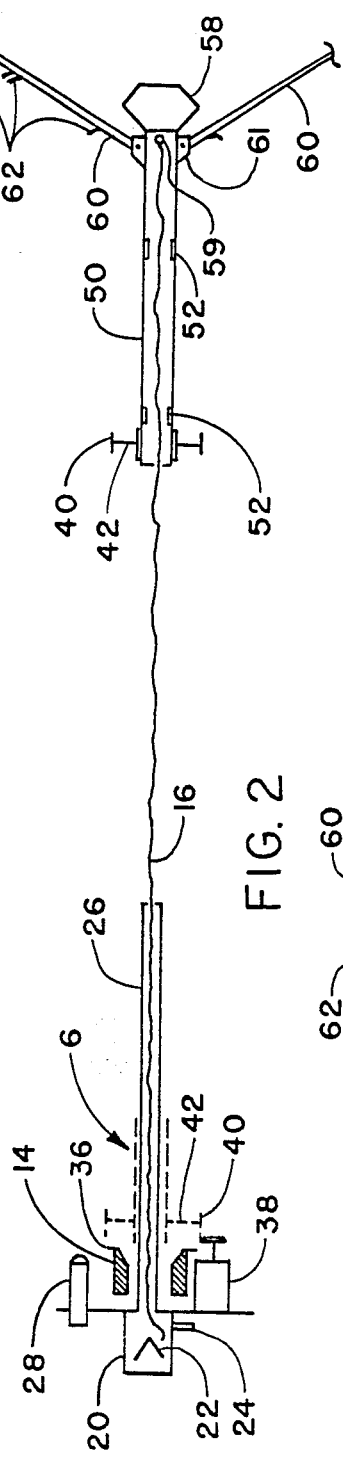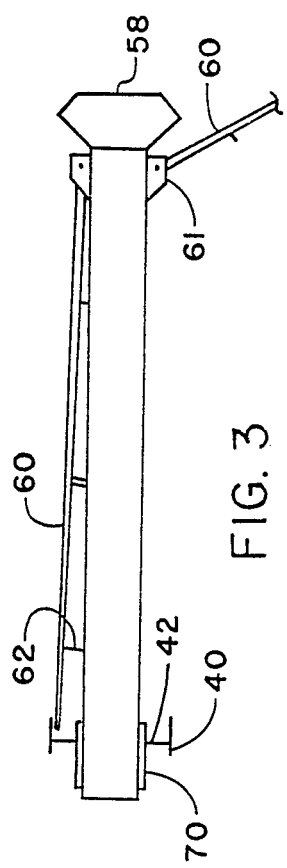

SATELLITE RETRIEVAL APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates to apparatus for capturing and retrieving objects, such as satellites, which are deployed in space.

In order to service an orbiting satellite from a spacecraft, such as America's space shuttle, it is necessary to provide apparatus capable of capturing and retrieving the satellite. In instances where the satellite does not have a cooperative docking interface, this is best accomplished by launching a grappling type device from the spacecraft toward the satellite. Since many satellites rotate about a predetermined satellite axis when in orbit, or may be tumbling or nutating, the retrieval apparatus must have the ability to bring such motion to a halt in this hostile environment. Furthermore, the retrieval apparatus should be capable of retrieving satellites of different size, mass and shape without causing damage to the satellites.

A satellite recovery system which addresses the basic requirements mentioned above is described in a paper entitled "Space Bola, A Satellite Retrieval System". This paper was presented by A. E. Wudell, D. A. Lewis and G. W. Smith of the Martin Company, at the Fourth Space Congress held at Cocoa Beach Fla. on Apr. 3–6, 1967.

The Wudell et al paper describes a grappling device which is guided to a satellite target and uses inflatable arms as the capturing mechanism. On contact, the arms are deflated and driven by their momentum or by solid propellant charges to enwrap the target. Small Velcro pads on the ends of the arms allow a lockup between the arms. Either a passive or active grappling device is proposed, depending on the dynamic characteristics of the target vehicle to be captured.

Although such a satellite recovery device, hereinafter referred to as the Martin device, bears a similarity to that disclosed and claimed herein, there are important differences in their construction, weight, size, strength, complexity, usefulness, target safety features, spin breaking mechanisms, recoverability, guidance mechanisms, effectiveness, reusability and energy efficiency. These differences will become apparent as this description of the two devices proceeds.

The Martin device, for example, has either two or three arms, hollow rubber tubes unrolled from the grappling unit and inflated by compressed air. Each arm preferrably has two inflatable air chambers, one to extend the arm, and one to cause encirclement of the target. The Velcro pads at the ends of the arms are very small (5.5 inches by 1.5 inches). Each arm also requires a vent port and possibly small propellant charges, remotely controlled, to aid the encirclement of the target. Each arm is unrolled by motor driven rollers, then inflated. The grappling unit must therefore include compressed air tanks, radio control devices and batteries.

For proper operation, it appears that the arms in the Martin device must unroll to the precise length needed to encircle a target, and the small Velcro pads must overlap with at least fifty percent accuracy. Therefore, the target diameter must be known in advance within one inch on a five foot target and the arm rollers must be capable of such accuracy. Clearly this is a very complex and expensive mechanism.

While no size is mentioned, a five foot target would appear to need three rolls of rubber arms at least eight feet long, coiled. No launching mechanism size is specified.

The strength of the inflatable arms of the Martin device is suspect when dealing with one ton targets. Target mass could easily be too much for inflatable arms and four square inches of Velcro pad to handle.

The Martin device utilizes one grappling arm configuration to capture spheres (three arms) and a different configuration to capture cylinders (two arms). A prior knowledge of the shape of the target satellite is therefore required. Also, as previously mentioned, the size of the target becomes critical and must be known within three inches in 15.7 feet of circumference.

If target spin or tumbling is to be cancelled, an attitude stabilization module must be added to the grappling unit, containing attitude stabilization thrusters, an onboard radar (or remote guidance via a television camera), fuel tanks and additional batteries. It would seem that the attitude stabilization module should always be available in the spacecraft in case the target has or acquires an unexpected spin. This additional 140 pound module required to accomplish spin braking is extremely complex and reduces the reliability of the retrieval system. It is in essence a guided rocket subject to numerous failures. Running it out of fuel or power renders it completely useless. Due to the tiny diameter of the unit, spin braking of large objects will be very slow and wasteful of fuel, if not impossible.

The Martin device weighs in the order of 200 pounds; 60 pounds for the passive grappling module and 140 pounds for the attitude stabilization module. These weight figures may even be conservative due to the complexity of this device. Adding this 200 pounds of weight to a spacecraft, such as the space shuttle, requires a significant increase in reaction fuel for the spacecraft to achieve a matching orbit.

Test results of the Martin device indicated that it required the impact of a fifteen foot drop to obtain ninety percent effective catches. One target in ten would need to be hit twice with that force. Also, the target must be capable of withstanding impact with a two hundred pound mass.

The Martin device uses power every second of its operation: for stabilization, radio contact, remote controls and a television link. Servicing the device would require three separate power sources: charged batteries, reaction fuel replacement, and recharged air tanks. Due to the complexity of the device, a complete operational checkout would seem to be prudent before relaunch.

OBJECTS OF THE INVENTION

It is therefore an object of the present invention to provide an improved apparatus for capturing and retrieving an object in space.

It is another object of the present invention to provide an improved satellite retrieval apparatus which is adapted to operate in conjunction with a space flight vehicle, such as America's space shuttle.

It is another object of the present invention to provide a mechanism for retrieving satellites in earth orbit, which mechanism is simple in operation, inexpensive to construct, of light weight, physically small, reusable, of high strength, versatile, efficient of energy, and having an effective spin braking mechanism.

These and many other objects, and features of the present invention will be readily apparent to those skilled in the pertinent art from the following detailed description of a preferred embodiment of the invention and the related drawings.

BRIEF DESCRIPTION OF THE DRAWINGS

FIG. 1 is a perspective view of the present invention when deployed from a spacecraft vehicle and approaching a satellite to be recovered;

FIG. 2 is an enlarged cross-sectional view of the launcher unit and the deployed grappling unit of the present invention; and FIG. 3 is a side view of the grappling unit as mounted on the launcher unit of the present invention.

DETAILED DESCRIPTION OF THE PREFERRED EMBODIMENT

Referring now to the drawings, and in particular, to FIG. 1, there is shown a space vehicle 2 having a launcher unit 4 which has launched the grappling unit 6 of this invention towards a satellite 8 to be captured and retrieved. The launcher unit 4 is shown projecting through the open payload doors 10 of spacecraft 2. A spacecraft arm 12 having the catch collar 14 of the present invention held in the end thereof is shown in its extended position. A retrieval line 16 attached to the launcher unit 4 extends through catch collar 14 and is attached to the grappling unit 6.

The details of the launcher unit 4 and grappling unit 6 are shown in greater detail in FIG. 2 of the drawings. Launcher unit 4, shown here in cross-section, includes a sealed chamber or box 20 having a retrieval reel 22 (similar in construction to open-faced deep sea fishing reels) therein for storing retrieval line 16. Sealed box 20 has an inlet 24 for providing air pressure to the interior of launch tube 26. Launcher unit 4 also includes a light aiming device 28, catching collar 14 having braking material 36 on a surface thereof, and a rotational drive motor 38, which engages a rotational drive ring 40 on the braking ring plate 42 of the grappling unit 6.

Aiming device 28 may be quite sophisticated, but it would be simplest to project a beam of light in a target pattern, much like a slide projector, along the axis of the launch tube 26. When the target pattern is projected onto the satellite, the beam (and grappling unit 6) are properly aimed. This aiming could be done by pivoting the base of the launch unit 4, but it may be simpler to fix its base flat in the cargo bay of the spacecraft and to position the spacecraft properly.

Grappling unit 6 will be seen in FIG. 2 to comprise a hollow shaft or cylinder 50 having one piece teflon bearings 52 machined to surround the interior of the shaft. Rotational drive ring 40 is affixed to one end of the hollow shaft 50 in a manner described later and engages the rotational drive motor 38. The position of the shaft 50 and drive ring 40 when grappling unit 6 is mounted on the launcher unit 4 is shown by the dashed lines surrounding launch tube 26. The other end of shaft 50 has a cushion 58 for making soft contact with the satellite target. Retrieval line 16 is fed through the interior of shaft 50 and is attached thereto by a swivel 59 which eliminates or reduces the twisting of the line.

Immediately behind cushion 58 are eight deployment arms 60, (only two of which are shown for clarity of the drawings) which are pivotally connected by spring-loaded pivot assemblies 61 to the shaft 50. Each deployment arm 60 has pins 62 for storage of a catching line 64 affixed to the end 68 of the deployment arm. A Velcro hook coil strip 66 is attached to the free end of catch rope 64. The deployment arms 60 may be tapered fiberglass poles.

FIG. 3 illustrates the grappling unit 6 in its prelaunch or stored condition. It will be seen in this figure that the deployment arms 60 are held in their folded positions by the interior of rotational drive ring 40. Rotational drive ring 40 and the associated braking ring plate 42 are attached to shaft 50 by a sleeve 70 which is keyed to shaft 50 to prevent rotation of drive ring 40 with respect to shaft 50, but to permit drive ring 40 to slide along shaft 50 to release arms 60 at launch.

Deployment arms 60 are mounted radially, like umbrella ribs, are folded back along the shaft 50 before launching, and are spring-loaded by pivot assembly 61 to open about 120 degrees after their release. Each length of catching line 64 and its coiled Velcro strip 66 is wrapped around pins 62 on shaft 50. The pins 62 may protrude into small matching holes in hollow shaft 50. Catching line 64 is not included in this figure to better illustrate the pin structure. Centrifugal forces will unwind the catching line 64 from each arm 60 and fling the Velcro strips 66 outward where the arms 60 are released.

The Velcro strip 66 at the end of each catching line 64 is a coil of Velcro hook material, preferably one inch wide and several feet long. When the catch lines 64 wrap around a target, the conservation of angular momentum and diminishing radius will cause each Velcro strip to be subjected to a high "G" force, uncoiling the strip. The exposed hook material will slap against the sides of the target satellite and bond to itself, to other Velcro strips, and to the fabric of the catching line 64. Each catching line 64 has a pile surface facilitating engagement with the hooks of the Velcro strips 66. Due to the low mass of the retrieval assembly and Velcro strips, no damage will result to the target.

The rotational drive 38 for the retrieval assembly is preferably reversible in direction, so that targets can be caught from either end of their rotational axes. The grappling unit 6 must be spun in the same direction as the target satellite if despinning is to work well. It may not be feasible to catch some objects by one end, due to factors such as long nose cones or delicate instruments, so a reversible drive is desireable for mission flexibility.

For safety considerations, the retrieval line 16 should be rated at a light breaking strength, relative to the masses involved. Also, a line cutaway device (not shown) may be provided to sever retrieval line 14 in an emergency situation. The drag setting of the retrieval reel 22 will, however minimize the danger of a satellite reeling itself into the spacecraft 2 in a worst-case situation. If a satellite began reeling out the retrieval line for any reason, it would be payed out until the reel was empty or the line 16 was cut.

In operation, the spacecraft 2 is maneuvered to match orbit with the satellite. Then the spacecraft's yaw rotational axis is positioned along the axis of rotation of the target object. A beam of light is projected from the aiming device 28 of launcher unit 4 towards the target satellite. This beam allows the grappling unit 6 to be aimed quite closely in the direction of the target satellite. Grappling unit 6 is then spun up to speed by rotational drive motor 38, and propelled from launcher unit 4 towards the target by a blast of air applied to inlet 24. Retrieval line 16, which is attached to the reel 22 passes freely through the launch tube 26 and pays out line effortlessly with no tangles.

As the grappling unit 6 clears the spacecraft bay, deployment arms 60 spring open and slightly forward, like an umbrella opening too far. Catching lines 64 with their Velcro "hook" strips 66 unwind to their limits, and the grappling unit sweeps a cylindrical volume of space. This volume is established the radius of the catch line 64 and the length of the retrieval line 16. Upon impact with the target satellite, the catch lines 64 wrap around the target, bola style and the Velcro strips 66 secure themselves to each other and to catching lines 64.

Before retrieval of a satellite begins, the manipulator arm 12 removes the catch collar 14 from the launch tube 26 and raises it to near maximum arm extension along the yaw axis. Retrieval line 16 is then reeled in, using the manipulator arm 12 as a "fishing pole" and shock absorber. Reel 22 may be motor driven with an adjustable drag setting—tension on the line will bring the target and spacecraft together. The motor drive for reel 22 (not shown) allows for precise control of retrieval speeds. The end of the arm 12 is positioned along the rotational axes of the captured satellite and the spacecraft, and catch collar 14 mounted thereon engages the shaft 50 when it arrives within reach. Arm 12 is used as a shock absorber to keep the target from being pulled into contact with the spacecraft. By holding the catching collar 14 with the shaft 50 of the grappling unit 4 therein and increasing the retrieval line tension, braking material 36 and braking ring plate 42 are engaged to despin the target.

It may then be necessary to stabilize the spacecraft using yaw thrusters as the spin is transmitted to the spacecraft. When stopped, the satellite can then be brought near the spacecraft bay for service or inspection. When repairs to the satellite have been completed, the catch lines 64 are peeled away or cut away and the satellite released or launched normally. Grappling unit 6 can be discarded, stored or reloaded onto launch tube 26. To reload simply requires winding each catching line 64 back onto its deployment arm pins 62 and folding each deployment arm 60 back into its prelaunch position.

While the present invention has been described in connection with a rather specific embodiment thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. Apparatus for capturing and retrieving objects from space comprising:
    launching means and grappling means;
    said launching means comprising a launch tube, a catch collar having a braking surface and being slideably positioned over said launch tube, reel means attached to said launch tube for storing a retrieval line threaded through said launch tube and attached to said grappling means, rotational drive means for rotating said grappling means when disposed on said launch tube, and pressurizing means for pressurizing said launch tube to propel said grappling means from said launching means;
    said grappling means comprising a hollow shaft having a first and a second end and being slideably positionable over said launch tube, shaft rotation means affixed to said shaft adapted for engagement with said rotational drive means, braking ring means formed on said shaft rotation means and aligned for engagement with said braking surface of said catch collar, a plurality of foldable deployment arms pivotally attached to said second end of said shaft, each of said plurality of arms having a catching line affixed to the free end thereof, each said catching line having bonding material at the extremity thereof distant from said arm, and a bumper pad adjacent said second end of said shaft.

2. Apparatus as defined in claim 1 and further comprising:
    aiming means affixed to said launcher means for aiming said grappling means in the direction toward said object.

3. Apparatus as defined in claim 2 wherein said catching line has a pile surface and wherein said bonding material comprises a strip of material having fibers with curved ends thereon adapted to hook into said pile surface of said catching line.

4. Apparatus as defined in claim 3 wherein said plurality of foldable deployment arms comprise eight deployment arms made of fiberglass rod material and symmetrically disposed about the longitudinal axis of said hollow shaft.

5. Apparatus as defined in claim 4 wherein said catch collar comprises a cylindrical sleeve having said braking surface disposed on an end surface thereof.

6. Apparatus as defined in claim 5 wherein each of said deployment arms has a plurality of pins thereon to hold said catching line.

* * * * *